United States Patent
Deromelaere et al.

(10) Patent No.: US 8,597,832 B2
(45) Date of Patent: Dec. 3, 2013

(54) LITHIUM-SULFUR CELL WITH NANOSTRUCTURED CATHODE AND METHOD FOR MANUFACTURING

(75) Inventors: Gaetan Deromelaere, Kornwestheim (DE); Richard Aumayer, Diekholzen (DE); Ulrich Eisele, Stuttgart (DE); Bernd Schumann, Rutesheim (DE); Martin Holger Koenigsmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 407 days.

(21) Appl. No.: 12/928,311

(22) Filed: Dec. 7, 2010

(65) Prior Publication Data

US 2011/0151335 A1 Jun. 23, 2011

(30) Foreign Application Priority Data

Dec. 23, 2009 (DE) .................. 10 2009 055 223
Feb. 5, 2010 (EP) ...................... 10152775

(51) Int. Cl.
    *H01M 4/13* (2010.01)
(52) U.S. Cl.
    USPC ............ 429/231.5; 429/231.1; 429/231.8; 429/218.1; 429/231.95
(58) Field of Classification Search
    CPC .................................. H01M 4/5815
    USPC ......... 429/231.1, 231.8, 218.1, 231.95, 231.5
    See application file for complete search history.

(56) References Cited

U.S. PATENT DOCUMENTS

| | | | |
|---|---|---|---|
| 6,194,099 B1 * | 2/2001 | Gernov et al. | 429/213 |
| 7,029,796 B2 | 4/2006 | Choi et al. | |
| 2004/0058246 A1 | 3/2004 | Choi et al. | |
| 2005/0196672 A1 | 9/2005 | Mukherjee et al. | |
| 2009/0286163 A1 | 11/2009 | Shin et al. | |
| 2010/0129699 A1 * | 5/2010 | Mikhaylik et al. | 429/50 |
| 2010/0285363 A1 * | 11/2010 | Christensen et al. | 429/231.95 |

FOREIGN PATENT DOCUMENTS

| | | |
|---|---|---|
| JP | 2006040557 A * | 2/2006 |
| KR | 2003 081778 | 10/2003 |
| KR | 2004 009381 | 1/2004 |
| KR | 2005 038254 | 4/2005 |
| WO | WO 99/33127 | 7/1999 |
| WO | WO 99/50921 | 10/1999 |
| WO | WO 00/36674 | 6/2000 |
| WO | WO 2008070059 A2 * | 6/2008 |

OTHER PUBLICATIONS

Huang et al. "The preparation and characterization of Li4Ti5O12/carbon nano-tubes for lithium ion battery" Electrochimica Acta 53 (2008) 7756-7759.*

* cited by examiner

*Primary Examiner* — Zachary Best
(74) *Attorney, Agent, or Firm* — Kenyon & Kenyon LLP

(57) ABSTRACT

A lithium-sulfur cell comprising an anode structure, a cathode structure and an electrolyte section abutting to the cathode structure. The cathode structure comprises a continuous layer of nanotubes or nanowires and sulfur particles. The sulfur particles are attached to the nanotubes or nanowires. The continuous layer of nanotubes or nanowires abuts to at least a part of the electrolyte section. The invention further relates to a corresponding method for manufacturing the inventive cell.

12 Claims, 2 Drawing Sheets

LITHIUM-SULFUR CELL WITH NANOSTRUCTURED CATHODE AND METHOD FOR MANUFACTURING

BACKGROUND OF THE INVENTION

1. Field of the Invention

The invention relates to lithium based batteries, and particularly to the structure of lithium-sulfur batteries for providing a high energy density and increased output power.

2. Description of Related Art

Lithium-ion batteries are widely known for a plurality of applications, for example, for mobile communication, entertainment or even for high-power applications like automotive applications. In particular, for the purpose of traction in automotive applications, lithium-ion batteries involve heavy accumulative systems, for example, battery weights of 600 kg for automotive applications with a range of 400 km. Due to their electrochemical concept, lithium-ion batteries have an energy storage capacity of about 100 Wh/kg.

Therefore, it is envisaged to use lithium-sulfur batteries which promise an energy density of up to 600 Wh/kg. However, current lithium-sulfur batteries show a number of drawbacks. Firstly, discharging occurs via a reaction chain of poly-sulfides, some of which dissolve in the electrolyte. However, reaction of dissolved sulfides with an unprotected anode leads to a self-discharge and prevents re-charge of the battery to full capacity. This is also known as shuttle mechanism.

Precipitation of sulfides may occur when the dissolved sulfides are cooled or the concentration is increased. This may cause an electrical shortcut between anode and cathode.

In U.S. Pat. No. 7,029,796 B2, a lithium sulphur battery is shown in which sulphur atoms are loosely surrounded by carbon tubes. These carbon tubes are used as conductive agent. However, since the sulphur particles are provided as powder, no mechanical stable layer is provided.

Battery structures known in the prior art use a cathode which is provided by a porous carbon-sulfur composite. Cyclic deposition and decomposition of $Li_2S$ leads to the rearrangement of the microstructure. This results in the interruption of electronic contacts between carbon particles, which significantly decreases the performance of the battery.

BRIEF SUMMARY OF THE INVENTION

It is therefore an object of the invention to provide an Li-sulfur battery or cell which solves at least some of these disadvantages and allows a higher performance.

The invention allows a significantly increased stability of the cathode structure and, in particular, avoids degradation of the cathode structure during charge or discharge processes. Further, any reactions of dissolved sulfides are prevented. Further, any shortcuts due to dissolved sulfides are prevented as an inherent property of the inventive cell structure. In addition, the present invention allows high ion mobility and a high specific surface of the cathode structure which enables high-power performance when charging or discharging the cell. In addition, the inventive structure provides mechanical integrity even if the battery is ex-posed to substantial mechanical stress. Further, cycle stability is retained for a high number of cycles.

It is the concept underlying the invention to use a continuous layer of nanotubes or nanowires as cathode structure, in which sulfur particles are distributed. In this way, the integrity of the cathode structure remains unchanged during charging or discharging. Further, the sulfur particles are retained within the continuous layer of nanotubes or nanowires, which provide a support for the sulfur particles delimiting the space for the sulfur particles to the continuous layer itself and, at the same time, provides a high ion interchange rate into or from the cathode structure. In this way, the nanowires or nanotubes provide a stable "housing" or support for the sulfur particles, but do not restrict the ion and electron transfer.

DETAILED DESCRIPTION OF THE INVENTION

Figure 1:
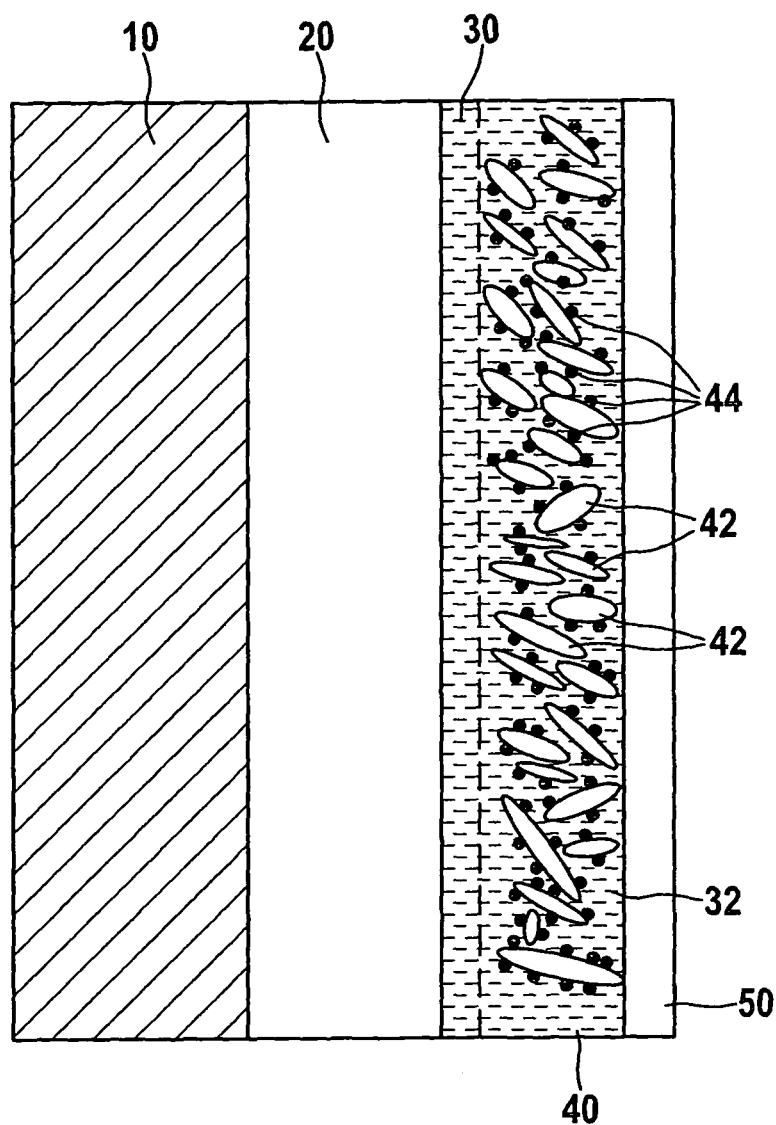
FIG. 1 shows an exemplifying structure of the inventive cell in a planar arrangement.

The inventive lithium-sulfur cell comprises an anode structure, a cathode structure and an electrolyte section sandwiched between the structures. At least a part of, the electrolyte section directly or indirectly contacts the cathode structure, wherein the cathode structure is comprised by a continuous layer of nanotubes or nanowires, in which sulfur particles are distributed. A direct contact can be provided by the electrolyte section abutting to the cathode structure, i.e. to the continuous layer of nanotubes or nanowires. An indirect contact can be provided by at least one intermediate layer sandwiched between the electrolyte section and the cathode structure. This intermediate layer is provided by an electrolyte material (provided in solid form) conductive for Li-ions. The intermediate layer and the solid electrolyte layer can be of different materials, however, are both of Li-Ion conducting materials. The electrolyte section can be considered as comprising a bi-layer structure of solid electrolyte layers of distinct materials. The intermediate layer can be used as protection layer for the solid electrolyte layer if it is necessary to protect the solid electrolyte layer from reactions with material of the cathode structure. Vice versa, the solid electrolyte layer can be used as protection layer for the intermediate layer, if it is necessary to protect the solid electrolyte layer from reactions with the anode structure (i.e. the lithium layer).

Further, the sulfur particles are attached on the surfaces of the nanotubes or nanowires or are held within the nanotubes. This continuous layer provides a fixed arrangement for the sulfur particles, but is easily accessible for ion or electron interchange. The continuous layer is provided as fabric, wherein the nanotubes or nanowires are mutually connected and intermixed. Within the continuous layer, spaces in a sense of open pores are provided which enable ion interchange with the sulfur particles or other interaction with the sulfur particles. In the context of the invention, continuous defines a mechanically integrated body, which might be flexible which, however, cannot be separated without destroying the given structure of the layer. Further, this defines that all parts of the continuous layer are mechanically interconnected such that moving one part of the continuous layer necessarily means that all other parts of the continuous layer are moved in the same way. Nevertheless, bending of the layer is possible which, however, does not change the basic structure of the layer.

By the use of nanotubes or nanowires, a very high specific surface can be reached. The continuous layer abuts to the electrolyte section or to at least a part thereof. In particular, a part of the electrolyte section can be provided within the continuous layer, in particular, if liquid electrolytes are used.

The nanotubes or nanowires are made of an electrically conducting material. Preferably, this material is also conducting for ions, in particular Li-ions. As nanotubes, carbon nanotubes are used. Further, the nanowires are provided by mixed conductor material. This mixed conductor material allows electric conduction as well as conduction for lithium ions. The mixed conductor material can be a material providing an electrode potential versus lithium below 2.9 V or below 2 V. Further, the mixed conductor material can be provided by in particular a Li—Ti-oxide or $Li_{4-x}Mg_xTi_5O_{12}$, with $0 \leq x \leq 2$ or $0 \leq x \leq 1$, or $Li_{4-x}Mg_xTi_{5-y}(Nb, Ta)_yO_{12}$, wherein $0 \leq x \leq 2$ or $0 \leq x \leq 1$ and $0 \leq y \leq 0, 1$ or $0 \leq y \leq 0.05$, or $Li_{2-x}Mg_xTi_{3-y}(Nb, Ta)_yO_7$ with $0 \leq x \leq 1$ or $0 < x < 0.5$ and $0 < y < 0.03$. The layer can be provided by nanotubes only or by nanowires only, or can be provided by nanotubes mixed with nanowires. If the continuous layer comprises nanotubes alone or a mixture of nanotubes and nanowires, the electrolyte section comprises liquid electrolytes which is distributes within the continuous layer. In an alternative embodiment, the nanotubes or nanowires are made of an electrically conducting material which does not conduct Li-Ions. In this case, an additional liquid electrolyte is located within the continuous layer (made of nanowires/nanotubes) in order to provide conductivity for Li-ions. In this alternative embodiment, the nanotubes or nanowires are provided by an electronic conducting material, in particular a metal or an alloy. The nanotubes or nanowires are combined with an the liquid electrolyte within the cathode structure, i.e. in between the nanotubes or nanowires. This combination provides a mixed conductor structure, equivalent to the proper-ties of an electrically conducting material.

The nanowires, nanotubes or the mixture thereof is in mechanical integrity. The nanotubes and/or the nanowires are mutually connected by van-de-Vaals forces, by covalent bond, by mechanical connections between the nanotubes and/or the nanowires. Alternatively or additionally, the nanotubes and/or the nanowires can be connected to and arranged on a support. Such a support can be provided by a layer of conducting material (which can be used as current collector). The sulfur particles comprise sulfur, any sulfides, in particular Li-sulfides and/or other sulfur compounds. These particles are immobilized onto the surfaces of the nanotubes, the nanowires or both or are immobilized within the nanotubes (or nanowires). The particles are incorporated within the continuous layer. Alternatively, or in combination therewith, the sulfur particles are incorporated or intercalated within the continuous layer of nanotubes (or nanowires). The sulphur particles are located in the inner space of the nanotubes, in between the nanowires/nanotubes or both. The sulphur particles are attached to the nanotubes/nanowires. By the physical or chemical bond between sulfur particles and nanotubes/nanowires, the presence of the sulfur particles is restricted on the space, in which the continuous layer extends. Further, this bond inhibits the removal of the sulfur particles into the electrolyte section.

According to a further aspect of the invention, the electrolyte section comprises solid electrolytes as well as liquid electrolytes. The solid electrolyte is given as a layer between the cathode structure and the anode structure. The solid electrolyte is provided by material conductive for lithium-ions, which is an electrical insulator. The liquid electrolyte or at least a part thereof is not provided between the cathode structure and the anode structure, but coextends with the continuous layer. In other words, the liquid electrolyte is provided within the "pores, gaps or interspaces within the continuous layer provided between the nanotubes and/or nanowires". In particular, it is preferred that the electrolyte section comprises liquid electrolyte if the continuous layer comprises a mixture of nanotubes and nanowires or is provided by nanotubes only. Since the nanotubes themselves do not provide ion connectivity, the liquid electrolyte provides the ionic connection between the nanotubes and the solid electrolyte. If liquid electrolyte is used, a part of the electrolyte section coextends with the continuous layer in that at least a part of the liquid electrolyte is filled in the spacing within the continuous layer. However, in each case, the solid electrolyte is provided between the solid electrolytes and the continuous layer carrying the sulfur particles.

The liquid electrolyte is either a pure liquid or a mixture of different electrolytes. The solid electrolyte can be provided as thin layer (for example thinner than 50 pm). The solid electrolyte can be provided by glass ceramic or lithium-based phosphate glass or another solid electrolyte. The solid electrolyte separates the lithium-metal anode of the anode structure from the cathode and is electronically insulating. In a preferred embodiment, the solid electrolyte is provided by $(n)Li_2S.(100-n)P_2S_5$ glass ceramic with $n=50 \ldots 90, 60 \ldots 80, 65 \ldots 75$ or about 70.

The cathode structure further comprises a current collector layer which abuts to the continuous layer of a nanotube or nanowires. The current collector layer comprises an electrical cathode connector for tapping the cathode structure. In addition or as an alternative thereto, the continuous layer may be provided with an electrical cathode connector for collecting the current. The electrical cathode connector is provided by a layer or a foil of electrically conducting material, in particular a metal or an alloy or any other electrically conducting materials. The current collector layer can be provided as a basis for nanotubes and/or nanowires, onto which the nanotubes and/or nanowires are grown. For this purpose, the current collector layer may have a cover layer for supporting the growth of nanowires or nanotubes. The continuous layer is therefore grown on the cur-rent collector layer. In an alternative, the current collector layer can be an individual cell element and the continuous layer can be an individual cell element. In this configuration, the continuous layer is in direct contact with the current collector layer, for example, by external fixation means. When the continuous layer comprises an electrical tap providing the electrical cathode connector, the continuous layer itself provides the current collector layer. Therefore, if the continuous layer comprises an electrical tap, the lithium-sulfur cell can be provided without current collector layer.

All layers and structure elements, in particular, the cathode structure, the anode structure, the (solid) electrolyte as well as the current collector layer provided as two-dimensional planar forms, which are stacked onto each other. Such a multi-layer stack can be wound-up or wrapped leading to a lithium-sulfur battery which comprises at least one of these folded stacks, each of these stacks providing a lithium-sulfur cell according to the invention. In this folded multi-layer structure, the arrangement of the anode structure, cathode structure and the electrolyte section is linear, wherein the folding component provides a periodic alternation of the assembly. In general, the layers and structure elements can be provided in a repeated structure, in particular as stacked structure. Further, the layers and structure elements can be folded/bound in order to increase the specific surface, e.g. as a 180° curvature which is followed by the structure elements or layers of a cathode/electrolyte and anode structure. In addition, multiple single structures of cathode/electrolyte and anode can be grouped.

In an alternative embodiment, the layers are not planar layers, but are at least partly concentric layers which are stacked onto each other in a radial direction. Such a lithium-sulfur battery comprises at least one inventive cell which is provided in a radial structure having a concentric layer structure. In an example, such a radial structure can be provided by an inner cylindrical lithium-metal anode and a solid electrolyte layer which covers the anode structure formed by the lithium-metal anode. In this way, the solid electrolyte has the form given by the outer surface of the inner cylinder. The cathode structure is arranged on the outer surface of the solid electrolyte. In this way, the continuous layer is arranged on the outer surface of the solid electrolyte. Finally, the current collector layer is arranged at the outer surface of the continuous layer. In this way, a coaxial and cylindrical structure can be provided.

Instead of a cylindrical inner lithium-metal anode as anode structure, a planar structure can be used. Since the electrolyte as well as the cathode structure follows the shape of the inner anode structure, cathode structure and electrolyte have a similar shape. In such a concentric arrangement, the anode is completely encapsulated by the solid electrolyte. Further, an electrical connection from the anode structure to the outside is given, similar to an electrical connection to the outer current collector. In this embodiment, the layer structure is given starting from the innermost anode structure and following a radial direction perpendicular to the anode structure.

In addition, the cathode structure is impregnated with the liquid electrolyte, which is conducting for lithium ions. In general, the solid electrolyte is used to prevent contact between the eventually existing rest of dissolved sulfites with the metallic lithium anode. Therefore, the solid electrolyte completely encloses the anode structure. In addition, the continuous layer and, in particular, the sulfur particles distributed therein, have intensive contact with the liquid electrolyte, if provided. In particular, the liquid electrolyte is in direct contact with the solid sulfur components providing the sulfur particles. In this way, the sulfites are staying inside or in between the continuous layer, while the continuous layer gives an excellent electronic contact and current collector for the sulfur particles. According to one aspect of the invention, the solid and the liquid electrolytes are in serial connection, wherein the liquid electrolyte ensures good contact to the sulfur/lithium sulfite-interface within and on the surface of the continuous layer. No rearrangement of the cathode structure occurs since the continuous layer is mechanically stable and is fixedly arranged on the current collector.

The invention is further provided by a method for manufacturing a lithium-sulfur cell as described herein. During the method, the continuous layer is provided leading to the cathode structure. Sulfur particles are introduced, for example, by depositing the particles from a gas phase or from a liquid solution, preferably in an electrochemical way. If the continuous layer comprises carbon nanotubes, at least a part of the liquid electrolytes is filled into the continuous layer after the sulfur particles have been applied into the continuous layer. By impregnating the continuous layer with liquid electrolyte, an ionic connection is provided between the sulfur particles and the solid electrolyte. In case of mixed connector materials within the continuous layer, the introduction of liquid electrolyte can be omitted since the mixed connector material itself is capable of conducting lithium ions.

The continuous layer of nanotubes or nanowires is preferably provided by chemical vapour deposition. The resulting nanotubes or nanowires can be interconnected for forming the continuous layer. Preferably, the nanotubes and/or nanowires are directly deposited onto a conductive layer providing the current collector layer of the cathode structure such that the continuous layer is bonded to the conductive layer by the deposition process. In other words, the nanotubes or nanowires can be grown directly on the connective layer which provides the current collector layer of the cathode structure.

According to one embodiment of the method, the solid electrolyte can be provided as thin layer (for example, thinner than 100 µm, thinner than 50 µm, thinner than 30 µm or even thinner) which allows to fold or wind up the layer structure in order to form a folded multi-layer stacked structure.

The components shown in FIG. 1 are not drawn to scale. FIG. 1 shows a cross-section of an inventive cell which is provided by planar layers. The cathode structure is provided by the lithium metal anode 10. On this lithium electrode 10, the solid electrolyte layer 20 is arranged. The surface opposite to the interface between solid electrolyte layer 20 and lithium metal anode 10 directly abuts to continuous layer 40. Even though the solid electrolyte layer 20 directly abuts to the continuous layer 40, a symbolic layer 30 is provided which is formed by the liquid electrolyte. This symbolic layer 30 is provided by the liquid electrolyte which connects the continuous layer 40 with the solid electrolyte layer 20. The continuous layer 40 is provided by nanotubes or nanowires 42 on which sulfur particles 44 are attached. In spacings between the nanotubes or nanowires (and between the sulfur particles arranged thereon), liquid electrolyte 32 is provided which connects the sulfur particles and the nanotubes ionically with the solid electrode layer 20 via the interface 30 provided by the liquid electrolyte. On the surface of the continuous layer 40 which is opposed to the interface between continuous layer 40 and solid electrolyte layer 20, a current collector layer 50 is arranged, on which the nanotubes or nanowires of the continuous layer 40 are affixed. The cell voltage is provided between the current selector layer 40 and the lithium metal anode 10. Electrical connection elements (not shown) can be provided therefore and can be attached to the anode structure 10 and to the current collector layer 40.

Figure 2:
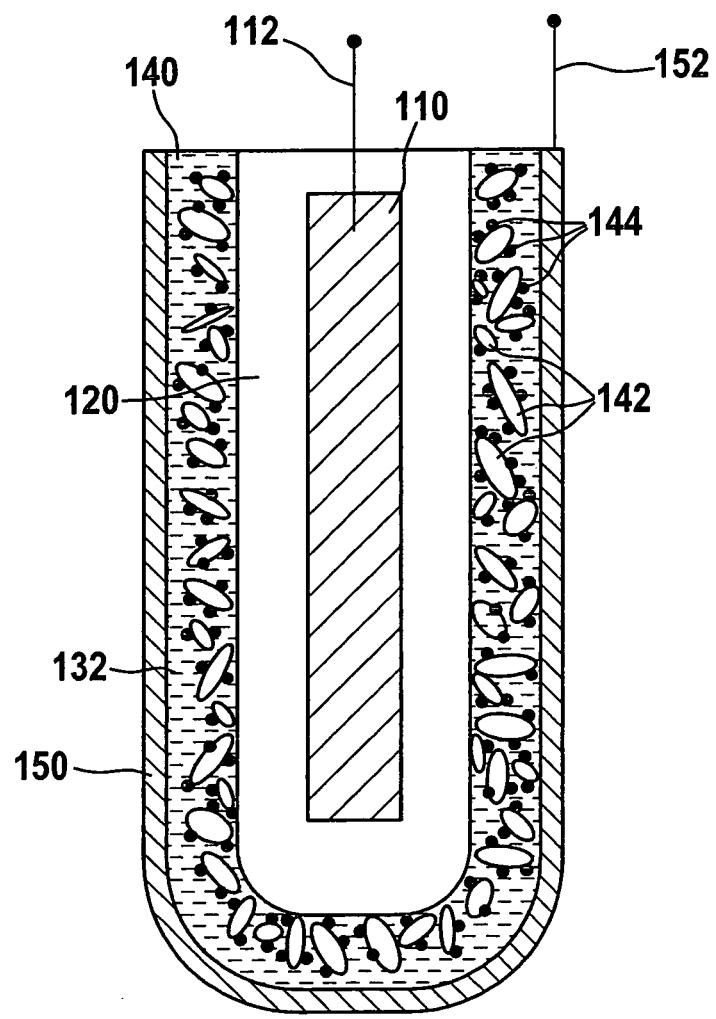
FIG. 2 shows an embodiment with a concentric layer structure.

In FIG. 2, an inner lithium metal anode 110 is given, similar to the lithium metal anode 10 which provides the anode structure. This anode structure 110 is completely surrounded by a layer of solid electrolyte 120. On the solid electrolyte layer 120, a continuous layer 140 is provided which comprises nanotubes or nanowires 142 as well as sulfur particles 144 arranged thereon. Within the "pores" or "spaces" between the nanotubes or nanowires 142, liquid electrolyte 132 is filled, which is in contact with the continuous layer. In this way, the continuous layer is impregnated with liquid electrolyte. Finally, an outer layer 150 is arranged which is a current collector layer surrounding the outer surface of the continuous layer 140. The anode structure 110 is connected via an electrical connection 112 to provide a first electrical terminal, and the outer current collector layer 150 comprises another electrical connection 152 which provides the second electrical terminal.

In FIG. 1, the interface 30 provided by the liquid electrolyte is represented symbolically by a thin layer. In reality, such a layer does not exist but the continuous layer directly abuts to the solid electrolyte layer. Interface layer 30 therefore only represents the connecting function of the liquid electrolyte. In FIG. 2, such an interface is not shown, the continuous layer directly abuts to the solid electrolyte layer.

What is claimed is:
1. A lithium-sulfur cell comprising:
an anode structure;
a cathode structure; and
an electrolyte section abutting to the cathode structure;
wherein:
the cathode structure comprises a continuous layer of (a) at least one of nanotubes and nanowires and (b) sulfur particles, the sulfur particles being attached to the at least one of the nanotubes and nanowires;
the continuous layer contacts at least a part of the electrolyte section; and the at least one of nanotubes and nanowires are formed of an Li—Ti oxide mixed conductor material that is electrically conductive and conductive for Li—ions.

2. The lithium-sulfur cell according to claim 1, wherein the Li—Ti oxide mixed conductor material is $Li_{4-x}Mg_xTi_5O_{12}$ with $0.05 \leq x \leq 0.2$.

3. The lithium-sulfur cell according to claim 1, wherein the Li—Ti oxide mixed conductor material is $Li_{4-x}Mg_xTi_5O_{12}$ with $0.08 \leq x \leq 0.12$.

4. The lithium-sulfur cell according to claim 1, wherein:
the at least one of the nanotubes and nanowires are at least one of:
mutually connected by one of: van-de-Vaals forces, covalent bonds, and mechanical connections between the at least one of the nanotubes and nanowires; and connected to and arranged on a support; and
the sulfur particles comprise sulfur, sulfides or other sulfur compounds that are at least one of immobilized onto or within the at least one of the nanotubes and nanowires, incorporated in the continuous layer, and intercalated in the continuous layer.

5. The lithium-sulfur cell according to claim 1, wherein:
the continuous layer comprises nanotubes;
the electrolyte section comprises (a) a layer of solid electrolyte that is conductive for lithium-ions and electrically insulating, and (b) a liquid electrolyte; and
the liquid electrolyte is in contact with the solid electrolyte and the nanotubes as well as sulfur particles carried thereby, the liquid electrolyte filling intermediate spacings within the continuous layer and being in ionic contact with the sulfur particles as well as with the solid electrolyte.

6. The lithium-sulfur cell according to claim 1, wherein the continuous layer comprises nanowires of the mixed conductor material enabling electronic and ionic conduction, the electrolyte section comprises a layer of solid electrolyte that is conductive for lithium-ions and electrically insulating, and the solid electrolyte is in ionic contact with the nanowires.

7. The lithium-sulfur cell according to claim 1, wherein the anode structure comprises elemental lithium or a lithium alloy and wherein the electrolyte section comprises a solid electrolyte layer provided by a Li-based phosphate glass, a $(n)Li_2S.(100-n)P_2S_5$ glass ceramic with $50 \leq n \leq 90$, or another solid electrolyte that is permeable for Li-ions and an electrical insulator.

8. The lithium-sulfur cell according to claim 7, wherein n of the glass ceramic is $65 \leq n \leq 75$.

9. The lithium-sulfur cell according to claim 1, wherein one of:
the cathode structure comprises a current collector layer abutting to the continuous layer, the current collector layer comprising an electrical cathode connector or being provided by a layer or foil of electrically conducting material, the at least one of nanotubes and nanowires being one of: grown on the current collector layer, and in direct contact with the current collector layer; and
the continuous layer comprises an electrical tab providing the electrical cathode connector.

10. A lithium-sulfur battery, comprising at least one lithium-sulfur cell according to claim 1, wherein the lithium-sulfur battery is provided as one of: (a) a stacked or wound up multilayer structure of cells, (b) a radial structure having a concentric layer structure, and (c) a structure of repeated lithium-sulfur cells that are provided as linear stacked layers or as bound or curved layers.

11. A method for manufacturing a lithium-sulfur cell according to claim 1, comprising:
providing the continuous layer of nanotubes or nanowires of the cathode structure, and introducing the sulfur particles by depositing the particles from a gas phase or electrochemically from liquid solution, and
filling at least a part of liquid electrolyte of the electrolyte section into the continuous layer after having applied the sulfur particles.

12. The method of claim 11, wherein the continuous layer of nanotubes or nanowires is provided by chemical vapour deposition of carbon onto a conductive layer or onto a current collector layer of the cathode structure.

* * * * *